US012609581B2

(12) United States Patent
Ito et al.

(10) Patent No.: US 12,609,581 B2
(45) Date of Patent: Apr. 21, 2026

(54) ELECTRIC ACTUATOR

(71) Applicant: AISIN CORPORATION, Kariya (JP)

(72) Inventors: Naoki Ito, Kariya (JP); Yoshitomo Nakahara, Kariya (JP); Masahiro Tajiri, Kariya (JP); Takashi Santo, Kariya (JP)

(73) Assignee: AISIN CORPORATION, Kariya (JP)

( * ) Notice: Subject to any disclaimer, the term of this patent is extended or adjusted under 35 U.S.C. 154(b) by 210 days.

(21) Appl. No.: 18/536,676

(22) Filed: Dec. 12, 2023

(65) Prior Publication Data

US 2024/0204611 A1 Jun. 20, 2024

(30) Foreign Application Priority Data

Dec. 20, 2022 (JP) ................................. 2022-203278

(51) Int. Cl.
*H02K 7/00* (2006.01)
*H02K 7/116* (2006.01)
*H02K 5/04* (2006.01)
(52) U.S. Cl.
CPC ............. *H02K 7/003* (2013.01); *H02K 7/116* (2013.01); *H02K 5/04* (2013.01)
(58) Field of Classification Search
CPC ........... H02K 7/003; H02K 7/116; H02K 5/04
See application file for complete search history.

(56) References Cited

U.S. PATENT DOCUMENTS 6,543,569 B1 * 4/2003 Shimizu ................ B21K 1/767
180/444

FOREIGN PATENT DOCUMENTS

JP 2019-11828 A 1/2019

* cited by examiner

*Primary Examiner* — Terrance L Kenerly
(74) *Attorney, Agent, or Firm* — Oblon, McClelland, Maier & Neustadt, L.L.P.

(57) ABSTRACT

An electric actuator includes an electric motor including a driving shaft; an input shaft coupled to the driving shaft; an input gear configured to rotate integrally with the input shaft; an output gear configured to rotate based on a power transmitted from the input gear; a bearing configured to rotatably support the input shaft; and a housing that houses the electric motor, the input shaft, the input gear, the output gear, and the bearing. The input shaft includes a first shaft portion that extends from the input gear toward the driving shaft of the electric motor, and a second shaft portion that extends from the input gear in a direction opposite to the first shaft portion and is supported by the bearing. The second shaft portion of the input shaft includes an outer peripheral groove that extends in a circumferential direction as advancing in the axial direction. The housing includes an exposure hole that exposes the second shaft portion of the input shaft to the outside.

5 Claims, 4 Drawing Sheets

ELECTRIC ACTUATOR

CROSS REFERENCE TO RELATED APPLICATIONS

This application is based on and claims priority under 35 U.S.C. § 119 to Japanese Patent Application 2022-203278, filed on Dec. 20, 2022, the entire content of which is incorporated herein by reference.

TECHNICAL FIELD

This disclosure relates to an electric actuator.

BACKGROUND DISCUSSION

JP 2019-11828A (Reference 1) discloses an electric actuator that drives a slide door or the like of a vehicle. The electric actuator includes an electric motor, a speed reduction mechanism that reduces a rotation speed of a rotation shaft of the electric motor, and a housing that houses components of the electric actuator.

In the electric actuator as described above, a temperature of the electric motor rises depending on a driving mode. In such a case, it is preferable that the air warmed by the electric motor does not remain in the housing.

SUMMARY

According to an aspect of the disclosure, an electric actuator that solves the above problems includes: an electric motor including a driving shaft; an input shaft coupled to the driving shaft; an input gear that rotates integrally with the input shaft; an output gear that rotates based on a power transmitted from the input gear; a bearing that rotatably supports the input shaft; and a housing that houses the electric motor, the input shaft, the input gear, the output gear, and the bearing. The input shaft includes a first shaft portion that extends from the input gear toward the driving shaft of the electric motor, and a second shaft portion that extends from the input gear in a direction opposite to the first shaft portion and is supported by the bearing. The second shaft portion of the input shaft includes an outer peripheral groove that extends in a circumferential direction as advancing in the axial direction. The housing includes an exposure hole that exposes the second shaft portion of the input shaft to the outside.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle including an electric actuator will be described.

Configuration of Embodiment

Figures 1, 2:
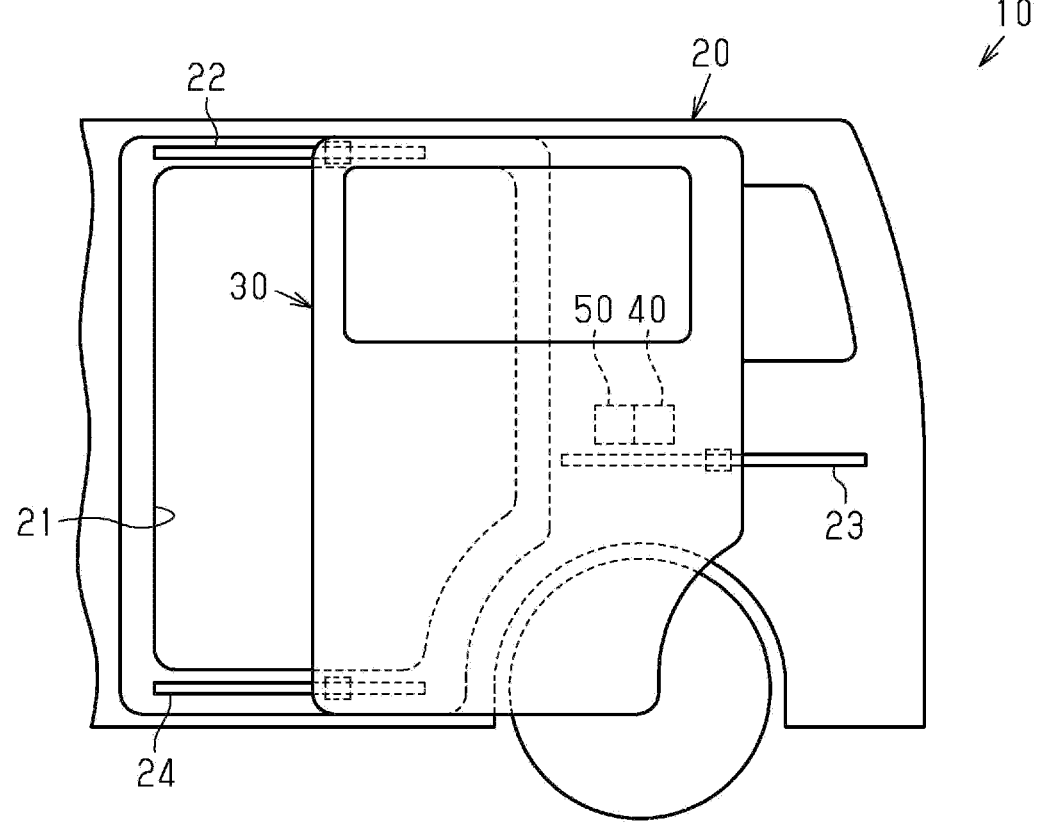
FIG. 1 is a schematic diagram of a vehicle including an electric actuator.
FIG. 2 is a plan view of the electric actuator.

As shown in FIG. 1, the vehicle 10 includes a vehicle body 20, a slide door 30, an electric actuator 40, and a conversion mechanism 50.

Vehicle Body 20

The vehicle body 20 includes a door opening portion 21 that opens to a side surface. The door opening portion 21 is a portion through which a user who gets in and out of the rear seat passes. The door opening portion 21 has a rectangular shape in a side view of the vehicle body 20. The vehicle body 20 includes an upper rail 22 disposed above the door opening portion 21, a center rail 23 disposed behind the door opening portion 21, and a lower rail 24 disposed below the door opening portion 21. In an up-down direction, the center rail 23 is disposed between the upper rail 22 and the lower rail 24. The upper rail 22, the center rail 23, and the lower rail 24 define a moving direction of the slide door 30.

Slide Door 30

The slide door 30 has a shape corresponding to the door opening portion 21. The slide door 30 is supported by the upper rail 22, the center rail 23, and the lower rail 24. The slide door 30 moves along the upper rail 22, the center rail 23, and the lower rail 24 to move between a fully closed position where the door opening portion 21 is fully closed and a fully open position where the door opening portion 21 is fully opened. In the embodiment, the slide door 30 performs a closing operation by moving forward and performs an opening operation by moving rearward.

Electric Actuator 40

Figure 3:
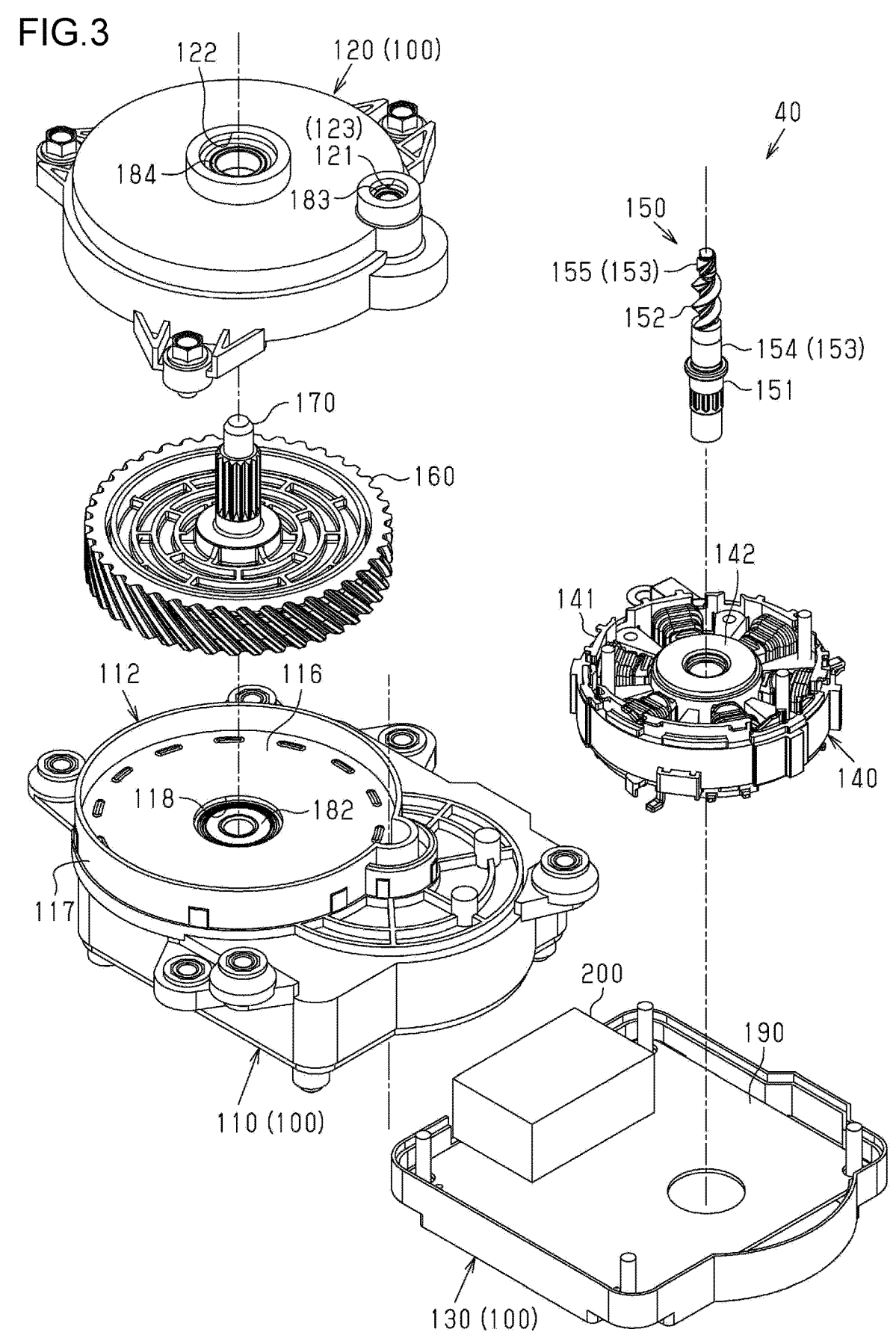
FIG. 3 is an exploded perspective view of the electric actuator.
Figure 4:
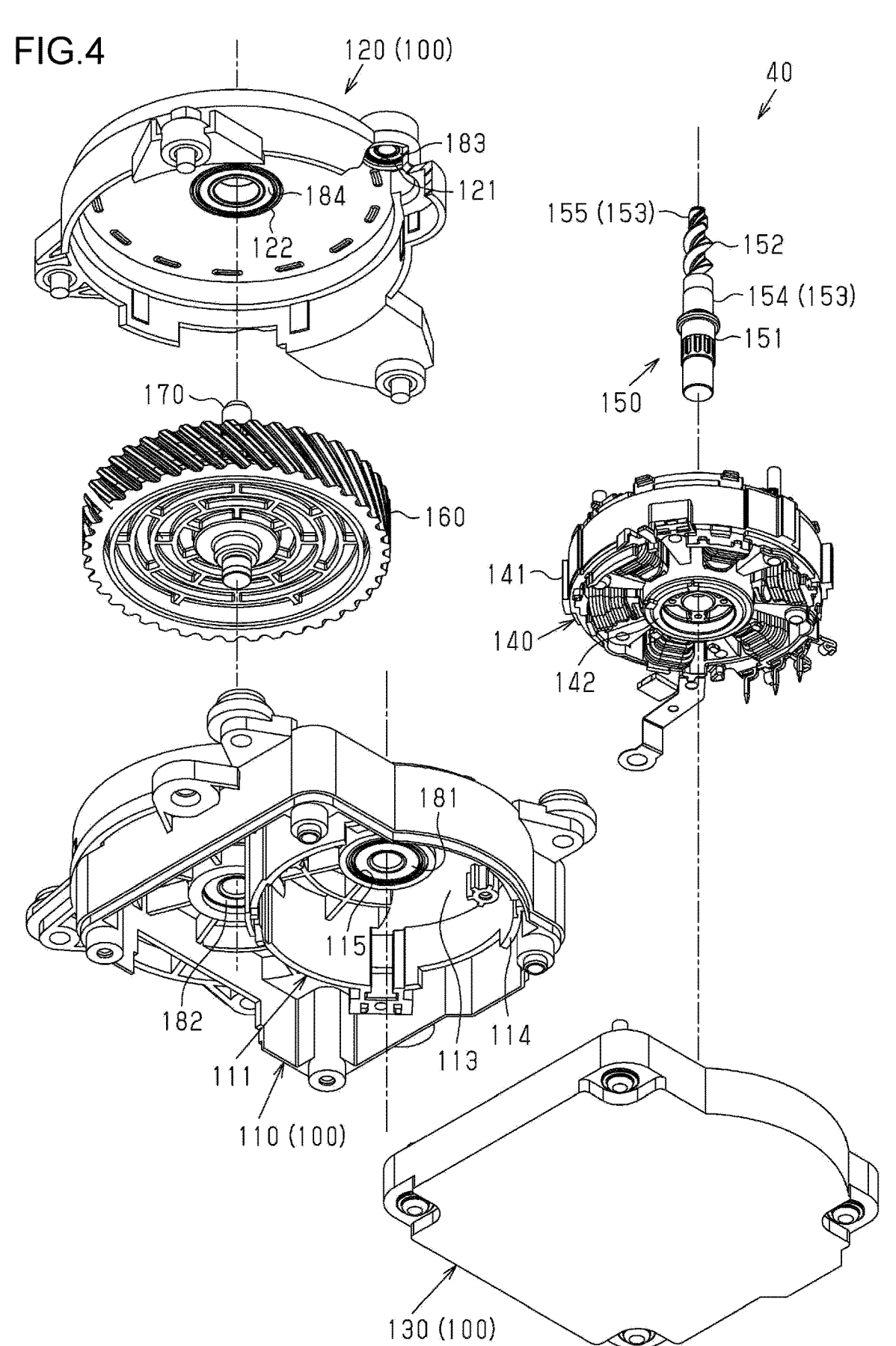
FIG. 4 is an exploded perspective view of the electric actuator.

As shown in FIGS. 2 to 4, the electric actuator 40 includes a housing 100, an electric motor 140, a rotation shaft 150, an output gear 160, an output shaft 170, a plurality of bearings 181 to 184, a control board 190, and a connector 200. Hereinafter, an axial direction of the rotation shaft 150 is simply referred to as an axial direction.

Housing 100

As shown in FIGS. 3 and 4, the housing 100 houses components of the electric actuator 40. The housing 100 is made of, for example, a resin material. The housing 100 includes a case 110, a top cover 120, and a bottom cover 130.

The case 110 has a box shape in which both sides in the axial direction are open. The case 110 includes a motor housing portion 111 that houses the electric motor 140 and a gear housing portion 112 that houses the output gear 160. The motor housing portion 111 includes a bottom wall 113 having a circular plate shape and a peripheral wall 114 extending in the axial direction from an edge of the bottom wall 113. The bottom wall 113 includes a first through hole 115 penetrating in the axial direction. The bearing 181 is press-fitted into the first through hole 115. The gear housing portion 112 includes a bottom wall 116 having a circular plate shape and a peripheral wall 117 extending in the axial direction from an edge of the bottom wall 116. The bottom wall 116 includes a second through hole 118 penetrating in the axial direction. The bearing 182 is press-fitted into the second through hole 118. A direction in which the peripheral wall 117 extends in the gear housing portion 112 is opposite to a direction in which the peripheral wall 114 extends in the motor housing portion 111.

The top cover 120 is a cover that covers the gear housing portion 112 of the case 110. The top cover 120 includes a first through hole 121 and a second through hole 122 penetrating in the axial direction. The bearing 183 is press-fitted into the first through hole 121, and the bearing 184 is press-fitted into the second through hole 122. The first through hole 121 includes an exposure hole 123. The bearing 183 is exposed to the outside of the top cover 120 through the exposure hole 123. The top cover 120 is fixed to the case 110 via fastening members such as bolts. At this time, an axis of the first through hole 121 of the top cover 120 coincides with an axis of the first through hole 115 of the case 110, and an axis of the second through hole 122 of the top cover 120 coincides with an axis of the second through hole 118 of the case 110. In other words, an axis of the bearing 181 coincides with an axis of the bearing 183, and an axis of the bearing 182 coincides with an axis of the bearing 184.

The bottom cover 130 is a cover that covers the motor housing portion 111 of the case 110. The bottom cover 130 is fixed to the case 110 via fastening members such as bolts.

In the embodiment, a gap between the case 110 and the top cover 120 and a gap between the case 110 and the bottom cover 130 are not sealed by a seal or the like. Therefore, the inside of the housing 100 is not a sealed space.

Electric Motor 140 and Rotation Shaft 150

The electric motor 140 includes a stator 141 and a rotor 142. In the embodiment, the electric motor 140 is an inner rotor type brushless motor. In another embodiment, the electric motor 140 may be an outer rotor type brushless motor, a brushed motor, or another motor.

Figure 5:
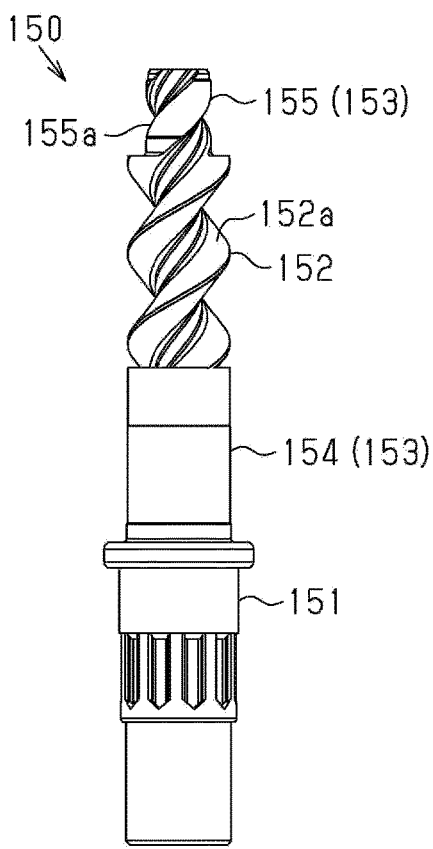
FIG. 5 is a side view of a rotation shaft of the electric actuator.

As shown in FIG. 5, the rotation shaft 150 is a single shaft-shaped member made of a metal material. The rotation shaft 150 includes a driving shaft 151, an input gear 152, and an input shaft 153. The rotation shaft 150 is preferably made of a material having high thermal conductivity.

The driving shaft 151 has a columnar shape. The driving shaft 151 is integrated with the rotor 142 of the electric motor 140 in a state of being inserted into the rotor 142. In the embodiment, relative rotation between the driving shaft 151 and the rotor 142 is prevented by engaging a spline shaft of the driving shaft 151 with a spline hole of the rotor 142. The driving shaft 151 can also be referred to as a component of the electric motor 140 in that the driving shaft 151 is integrated with the rotor 142.

The input gear 152 is a helical gear having a worm shape. Therefore, tooth grooves 152a of the input gear 152 extend spirally. A length of the input gear 152 in the axial direction is longer than a reference circle diameter of the input gear 152. The number of teeth of the input gear 152 is "2". Therefore, there are two tooth grooves 152a of the input gear 152.

The input shaft 153 includes a first shaft portion 154 extending from the input gear 152 toward the driving shaft 151, and a second shaft portion 155 extending from the input gear 152 in a direction opposite to the first shaft portion 154. The first shaft portion 154 and the second shaft portion 155 both have a columnar shape. A diameter of the first shaft portion 154 is larger than a diameter of the second shaft portion 155 and is equal to a diameter of a tooth tip circle of the input gear 152. The first shaft portion 154 is a portion of the rotation shaft 150 between the driving shaft 151 and the input gear 152. The second shaft portion 155 includes two outer peripheral grooves 155a that extend in a radial direction as the outer peripheral grooves 155a extend in the axial direction. The two outer peripheral grooves 155a extend spirally like screw grooves. The two outer peripheral grooves 155a are respectively coupled to the two tooth grooves 152a of the input gear 152. That is, a form of the outer peripheral grooves 155a in the axial direction corresponds to a form of the tooth grooves 152a of the input gear 152 in the axial direction. For example, the second shaft portion 155 of the input shaft 153 can be obtained by cutting, in the radial direction, an outer peripheral surface of a tip end portion of the input gear 152 formed longer than an original length of the input gear 152 in the axial direction.

Output Gear 160 and Output Shaft 170

As shown in FIGS. 3 and 4, the output gear 160 is a helical gear. A tooth width of the output gear 160 is shorter than a reference circle diameter of the output gear 160. The number of teeth of the output gear 160 is larger than the number of teeth of the input gear 152, and the reference circle diameter of the output gear 160 is larger than the reference circle diameter of the input gear 152. The output shaft 170 has a columnar shape. The output shaft 170 is integrated with the output gear 160 by, for example, insert molding. Thus, the output shaft 170 is rotatable integrally with the output gear 160.

Control Board 190 and Connector 200

As shown in FIG. 3, the control board 190 has a rectangular plate shape. The control board 190 has a driving circuit for driving the electric motor 140. An electrode of the electric motor 140 is coupled to the control board 190. The connector 200 is provided on the control board 190. An end portion of a harness in which a signal line and a power supply line coupled to the electric actuator 40 are collected is attached to the connector 200.

Arrangement Relationship of Components of Electric Actuator 40

Figure 6:
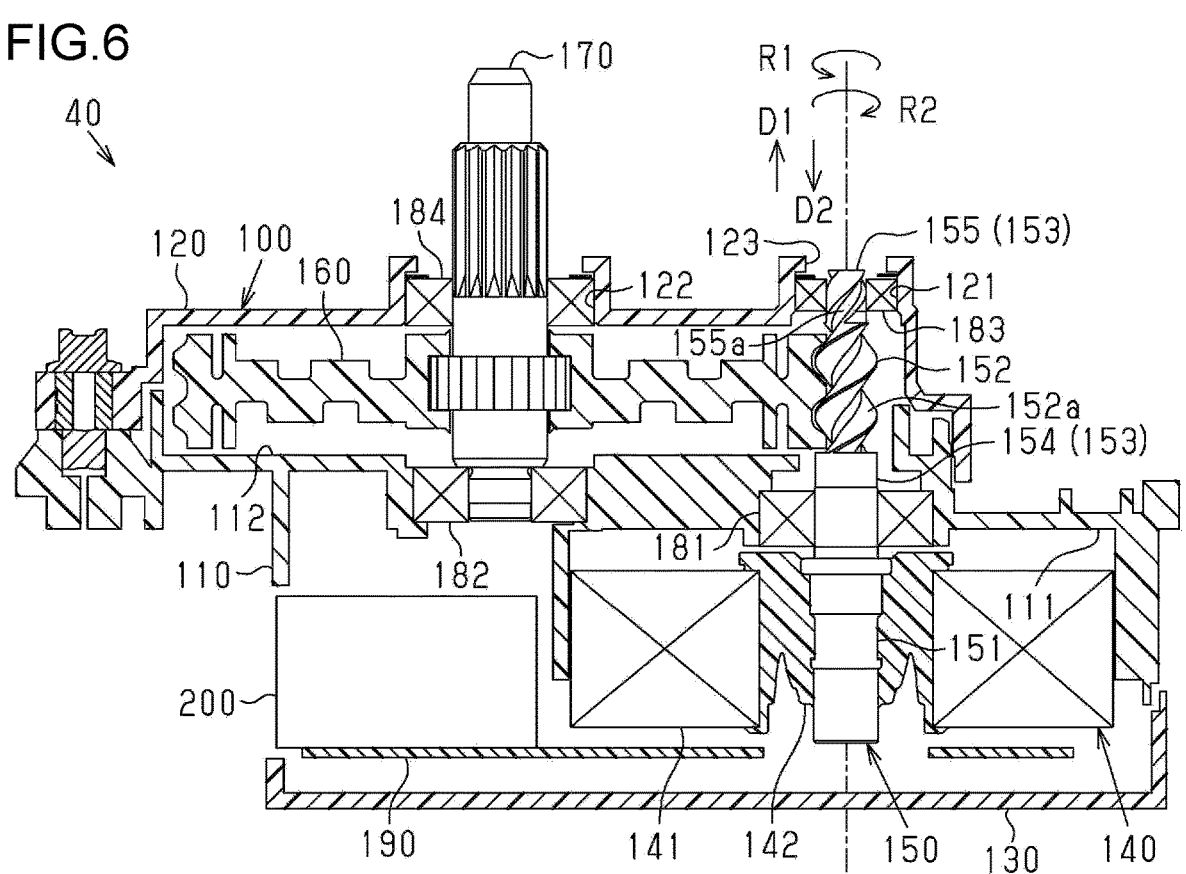
FIG. 6 is a cross-sectional view taken along a line 6-6 in FIG. 2.

As shown in FIGS. 3, 4, and 6, the electric motor 140 is housed in the motor housing portion 111 of the case 110. At this time, the rotation shaft 150 extending from the electric motor 140 is inserted through the bearings 181 and 183. Specifically, the first shaft portion 154 of the rotation shaft 150 is rotatably supported by the bearing 181, and the second shaft portion 155 of the rotation shaft 150 is rotatably supported by the bearing 183. The first through hole 121 of the top cover 120 is located on an extension line of an axis of the second shaft portion 155 of the rotation shaft 150. Therefore, a tip end surface of the second shaft portion 155 of the rotation shaft 150 is exposed to the outside through the exposure hole 123 of the top cover 120. However, the second shaft portion 155 of the rotation shaft 150 does not protrude to the outside from the exposure hole 123 of the top cover 120. An outer diameter of the second shaft portion 155 is substantially equal to an inner diameter of the bearing 183. Therefore, a part of the second shaft portion 155 in which the outer peripheral groove 155a is not formed is in contact with the bearing 183, but a part in which the outer peripheral grooves 155a are formed is not in contact with the bearing 183. In this respect, a space inside the housing 100 is coupled to a space outside the housing 100 via the outer peripheral grooves 155a of the second shaft portion 155.

The output gear 160 is housed between the gear housing portion 112 of the case 110 and the top cover 120. At this time, the output gear 160 meshes with the input gear 152. The axis of the output gear 160 and the axis of the input gear 152 are parallel to each other. The output shaft 170 is rotatably supported by the bearings 182 and 184 on both sides of the output gear 160 in the axial direction. A portion of the output shaft 170 extending from the output gear 160 toward the top cover 120 protrudes from the top cover 120 through the second through hole 122.

The control board 190 and the connector 200 are disposed between the electric motor 140 and the bottom cover 130. At this time, a portion of the connector 200 is exposed to the outside through an opening provided across the case 110 and the bottom cover 130. Thus, even when the bottom cover 130 is fixed to the case 110, the end portion of the harness can be attached to the connector 200.

Conversion Mechanism 50

As shown in FIG. 1, the conversion mechanism 50 converts a rotational motion of the output shaft 170 of the electric actuator 40 into a motion of the slide door 30 in an opening and closing direction. When the rotation shaft 150 of the electric actuator 40 rotates in a first rotation direction R1, the conversion mechanism 50 applies a load in the opening direction to the slide door 30. On the other hand, when the output shaft 170 of the electric actuator 40 rotates in a second rotation direction R2, the conversion mechanism 50 applies a load in the closing direction to the slide door 30. For example, the conversion mechanism 50 may include a drum that rotates together with the output shaft 170 and a cable that is wound around the drum. In this case, a first end of the cable is fixed to a front end of the center rail 23, and a second end of the cable is fixed to a rear end of the center rail 23. The conversion mechanism 50 may include a pulley that rotates together with the output shaft 170 and a belt wound around the pulley. In this case, a portion of the belt is fixed to the slide door 30.

Operation of Embodiment

An operation of the electric actuator 40 will be described with reference to FIG. 6.

When the slide door 30 is opened, as shown in FIG. 6, the rotation shaft 150 is rotated in the first rotation direction R1 by the electric motor 140. Thus, a power of the electric motor 140 is transmitted to the output gear 160 via the input gear 152. As a result, the rotational motion of the output shaft 170 is converted by the conversion mechanism 50, and the slide door 30 is opened.

In the electric actuator 40, the rotation shaft 150 includes the second shaft portion 155 including the spiral outer peripheral grooves 155a and the input gear 152 including the spiral tooth grooves 152a. Therefore, when the rotation shaft 150 rotates in the first rotation direction R1, the air inside the outer peripheral grooves 155a of the second shaft portion 155 and the air inside the tooth grooves 152a of the input gear 152 are conveyed in a first direction D1. As a result, the air inside the housing 100 is discharged to the outside of the housing 100 via the exposure hole 123 of the housing 100. In other words, air warmed by heat sources such as the electric motor 140 and the control board 190 is discharged to the outside of the housing 100. Here, when air is discharged to the outside of the housing 100, the same amount of air as the air discharged to the outside of the housing 100 flows in from a gap of the housing 100.

When the slide door 30 is closed, as shown in FIG. 6, the rotation shaft 150 is rotated in the second rotation direction R2 by the electric motor 140. Thus, the power of the electric motor 140 is transmitted to the output gear 160 via the input gear 152. As a result, the rotational motion of the output shaft 170 is converted by the conversion mechanism 50, and the slide door 30 is closed.

In the electric actuator 40, the rotation shaft 150 includes the second shaft portion 155 including the spiral outer peripheral grooves 155a and the input gear 152 including the spiral tooth grooves 152a. Therefore, when the rotation shaft 150 rotates in the second rotation direction R2, the air in the outer peripheral grooves 155a of the second shaft portion 155 and the air in the tooth grooves 152a of the input gear 152 are conveyed in a second direction D2. As a result, air outside the housing 100 is taken into the inside of the housing 100 via the exposure hole 123 of the housing 100. In other words, air having a temperature lower than the inside of the housing 100 is taken into the inside of the housing 100. Here, when air is taken into the housing 100, the same amount of air as the air taken into the housing 100 flows out from the gap of the housing 100.

Accordingly, when the electric actuator 40 is driven, the air is discharged from the inside of the housing 100 or the air is taken into the inside of the housing 100. Thus, air warmed by the electric motor 140 or the like is prevented from remaining inside the housing 100.

Effects of Embodiment (1) When the input gear 152 rotates, that is, when the input shaft 153 rotates, the second shaft portion 155 supported by the bearing 181 rotates. Since the second shaft portion 155 includes the outer peripheral grooves 155a that advance in a circumferential direction as advancing in the axial direction, when the second shaft portion 155 rotates, the air inside the outer peripheral grooves 155a is conveyed in the axial direction. Thus, the electric actuator 40 can prevent the warmed air from remaining inside the housing 100. As a result, the electric actuator 40 can present an increase in the temperature inside the housing 100.

(2) In the input shaft 153 of the electric actuator 40, the outer peripheral grooves 155a of the second shaft portion 155 are coupled to the tooth grooves 152a of the input gear 152. The electric actuator 40 can convey air in the axial direction not only via the outer peripheral grooves 155a of the second shaft portion 155 but also via the tooth grooves 152a of the input gear 152. Therefore, the electric actuator 40 can further prevent the warmed air from remaining inside the housing 100.

(3) The driving shaft 151 and the input shaft 153 are integrally formed of a metal material. Therefore, in the electric actuator 40, heat is easily transferred from the driving shaft 151 to the input shaft 153. As a result, the electric actuator 40 can present an increase in the temperature of the driving shaft 151.

(4) The input gear 152 and the input shaft 153 are integrally formed. Therefore, compared to a case where the input gear 152 and the input shaft 153 are formed separately, the number of components constituting the electric actuator 40 is reduced.

(5) In the housing 100, the exposure hole 123 is located in a direction in which the axis of the input shaft 153 extends. Therefore, when the input shaft 153 rotates, the electric actuator 40 easily takes in the air outside the housing 100 via the exposure hole 123 or easily discharges the air inside the housing 100 via the exposure hole 123. Thus, the electric actuator 40 can further prevent hot air generated by the heat generation of the electric motor 140 from remaining inside the housing 100.

(6) In the electric actuator 40, the axis of the input gear 152 and the axis of the output gear 160 are parallel to each other. Therefore, a shape of the electric actuator 40 is a flat shape having a thin thickness in the axial direction. Accordingly, the electric actuator 40 can be disposed in a narrow space such as the inside of the slide door 30.

Modification

The embodiment can be modified and implemented as follows. The embodiment and the following modification can be implemented in combination with each other as long as no technical inconsistency arises.

In the rotation shaft 150, the driving shaft 151 and the input shaft 153 may be separate bodies. In this case, the driving shaft 151 and the input shaft 153 are preferably coupled to each other via a shaft coupling.

In the rotation shaft 150, the input gear 152 and the input shaft 153 may be separate bodies. In this case, the input shaft 153 is preferably integrated with the input gear 152 so as not to rotate relative to the input gear 152.

In the above embodiment, the second shaft portion 155 including the outer peripheral grooves 155a is provided only at one end of the rotation shaft 150 in the axial direction. The second shaft portion 155 including the outer peripheral grooves 155a may be provided at both end portions of the rotation shaft 150 in the axial direction.

In the rotation shaft 150, the outer peripheral grooves 155a of the second shaft portion 155 and the tooth grooves 152a of the input gear 152 may not be coupled in the axial direction.

The exposure hole 123 of the housing 100 may not be opened in the direction in which the axis of the input shaft 153 extends. The exposure hole 123 of the housing 100 may be opened around the second shaft portion 155 of the input shaft 153.

The axis of the input gear 152 and the axis of the output gear 160 may intersect each other. For example, the input gear 152 and the output gear 160 may be bevel gears.

The axis of the input gear 152 and the axis of the output gear 160 may be different from each other. For example, the input gear 152 and the output gear 160 may constitute a worm gear or a screw gear.

In addition, the input gear 152 and the output gear 160 may constitute a face gear, a hypoid gear, or a rack-and-pinion.

When the rotation shaft 150 of the electric actuator 40 rotates in the first rotation direction R1, the slide door 30 may be closed. Similarly, when the rotation shaft 150 of the electric actuator 40 rotates in the second rotation direction R2, the slide door 30 may be opened.

The use of the electric actuator 40 can be changed as appropriate. For example, the electric actuator 40 may be used to drive a back door of the vehicle 10, a window glass of the vehicle 10, or a movable panel of a sun roof. Further, the electric actuator 40 may be used as a power source for driving a driving target not mounted on the vehicle 10.

[Aspect 1] An electric actuator includes: an electric motor including a driving shaft; an input shaft coupled to the driving shaft; an input gear that rotates integrally with the input shaft; an output gear that rotates based on a power transmitted from the input gear; a bearing that rotatably supports the input shaft; and a housing that houses the electric motor, the input shaft, the input gear, the output gear, and the bearing. The input shaft includes a first shaft portion that extends from the input gear toward the driving shaft of the electric motor, and a second shaft portion that extends from the input gear in a direction opposite to the first shaft portion and is supported by the bearing. The second shaft portion of the input shaft includes an outer peripheral groove that extends in a circumferential direction as advancing in the axial direction. The housing includes an exposure hole that exposes the second shaft portion of the input shaft to the outside.

In the electric actuator, when the electric motor is driven, the power of the electric motor is transmitted to the output gear via the input gear. Then, the power is transmitted from the output gear to a driving target. Here, when the input gear rotates, that is, when the input shaft rotates, the second shaft portion supported by the bearing rotates. Since the second shaft portion includes the outer peripheral groove that advances in a circumferential direction as advancing in the axial direction, when the second shaft portion rotates, the air inside the outer peripheral groove is conveyed in the axial direction. Specifically, according to a rotation direction of the second shaft portion, air inside the housing is discharged to the outside of the housing, or air outside the housing is taken into the inside of the housing. Thus, the electric actuator can prevent the air warmed by the electric motor from remaining inside the housing. As a result, the electric actuator can present an increase in the temperature inside the housing.

[Aspect 2] In the electric actuator according to aspect 1, the input gear is a helical gear, and the outer peripheral groove of the second shaft portion is coupled to a tooth groove of the input gear.

The electric actuator can convey air in the axial direction not only via the outer peripheral groove of the second shaft portion but also via the tooth groove of the input gear. Therefore, the electric actuator can further prevent the air warmed by the electric motor from remaining inside the housing.

[Aspect 3] In the electric actuator according to aspect 1 or 2, the driving shaft and the input shaft are integrally formed of a metal material.

In the electric actuator, heat is easily transferred from the driving shaft to the input shaft. Therefore, the electric actuator can prevent an increase in the temperature of the driving shaft.

[Aspect 4] In the electric actuator according to any one of aspects 1 to 3, the input shaft and the input gear are integrally formed.

As compared with the case where the input shaft and the input gear are formed separately, the number of components constituting the electric actuator is reduced.

[Aspect 5] In the electric actuator according to any one of aspects 1 to 4, in the housing, the exposure hole is located in a direction in which an axis of the input shaft extends.

When the input shaft rotates, the electric actuator easily takes in the air outside the housing via the exposure hole or easily discharges the air inside the housing via the exposure hole. The electric actuator can further prevent hot air generated by the heat generation of the electric motor from remaining inside the housing.

[Aspect 6] In the electric actuator according to any one of aspects 1 to 5, an axis of the input gear and an axis of the output gear are parallel to each other.

Since the axis of the input gear and the axis of the output gear are parallel to each other, the electric actuator is easily configured to be flat. Such an electric actuator can be easily disposed in a narrow space.

The electric actuator can prevent the warmed air from remaining inside the housing.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric actuator comprising:

an electric motor including a driving shaft;

an input shaft coupled to the driving shaft;

an input gear configured to rotate integrally with the input shaft;

an output gear configured to rotate based on a power transmitted from the input gear;

a bearing configured to rotatably support the input shaft; and a housing that houses the electric motor, the input shaft, the input gear, the output gear, and the bearing, wherein the input shaft includes a first shaft portion that extends from the input gear toward the driving shaft of the electric motor, and a second shaft portion that extends from the input gear in a direction opposite to the first shaft portion and is supported by the bearing, the second shaft portion of the input shaft includes an outer peripheral groove that extends in a circumferential direction as advancing in an axial direction, the housing includes an exposure hole that exposes the second shaft portion of the input shaft to the outside, the input gear is a helical gear, and the outer peripheral groove of the second shaft portion is coupled to a tooth groove of the input gear.

2. The electric actuator according to claim 1, wherein the driving shaft and the input shaft are integrally formed of a metal material.

3. The electric actuator according to claim 1, wherein the input shaft and the input gear are integrally formed.

4. The electric actuator according to claim 1, wherein in the housing, the exposure hole is located in a direction in which an axis of the input shaft extends.

5. The electric actuator according to claim 1, wherein an axis of the input gear and an axis of the output gear are parallel to each other.

\* \* \* \* \*